(12) United States Patent
Hundley et al.

(10) Patent No.: US 7,677,501 B1
(45) Date of Patent: Mar. 16, 2010

(54) STORE AND MUNITIONS RELEASE SYSTEM HAVING DEPLOYABLE SWAYBRACE CLAW

(75) Inventors: Lucas Adam Hundley, Pasadena, CA (US); Guillermo Barba, La Habra, CA (US); Frank Garcia, Jr., Walnut, CA (US)

(73) Assignee: Sargent Fletcher, Inc., El Monte, CA (US)

( * ) Notice: Subject to any disclaimer, the term of this patent is extended or adjusted under 35 U.S.C. 154(b) by 332 days.

(21) Appl. No.: 11/973,262

(22) Filed: Oct. 5, 2007

Related U.S. Application Data

(60) Provisional application No. 60/850,517, filed on Oct. 10, 2006.

(51) Int. Cl.
*B64D 1/12* (2006.01)
(52) U.S. Cl. .................. 244/137.4; 89/1.54; 294/82.26
(58) Field of Classification Search ............. 244/137.4; 89/1.54, 1.53, 1.58; 294/82.26
See application file for complete search history.

(56) References Cited

U.S. PATENT DOCUMENTS

| | | | |
|---|---|---|---|
| 1,508,192 A | * | 9/1924 | Lesh ........................ 89/1.58 |
| 2,481,542 A | * | 9/1949 | Schuyler ................... 89/1.815 |
| 3,677,506 A | | 7/1972 | La Roe |
| 4,202,576 A | * | 5/1980 | Hasquenoph et al. .... 294/82.26 |
| 4,318,561 A | * | 3/1982 | Hasquenoph et al. .... 294/82.26 |
| 4,850,553 A | | 7/1989 | Takata et al. |
| 5,904,323 A | | 5/1999 | Jakubowski, Jr. et al. |
| 5,932,829 A | * | 8/1999 | Jakubowski, Jr. .......... 89/1.54 |
| 6,688,209 B1 | * | 2/2004 | McMahon et al. .......... 89/1.59 |
| 7,083,148 B2 | * | 8/2006 | Bajuyo et al. ............ 244/137.4 |

FOREIGN PATENT DOCUMENTS

FR    EP499749    * 8/1992

* cited by examiner

*Primary Examiner*—Christopher P Ellis
(74) *Attorney, Agent, or Firm*—Jaeckle, Fleischmann & Mugel, LLP

(57) ABSTRACT

A system for releasing an article such as a munition or store from an aircraft employs a sway brace or cradle built into the structure of a bomb rack from lateral or pitching motion before it is released. A claw mechanism is driven out of the sway braces into the article to hold the article in place on the sway braces. The claws retain the article in the sway braces until the article is no longer influenced by the sway braces.

8 Claims, 4 Drawing Sheets

STORE AND MUNITIONS RELEASE SYSTEM HAVING DEPLOYABLE SWAYBRACE CLAW

This application is based on Provisional Application 60/850,517 filed on Oct. 10, 2006.

BACKGROUND OF THE INVENTION

1. Field of the Invention

This invention relates to a system for releasing an article such as a munition or store from an aircraft and more particularly to such a system in which the release system includes a sway brace with claws therein top control the movement of the store or munition when it is released.

2. Description of the Related Art

Prior air bomb racks often use extending pistons to force a munition or store from the weapons bay of an aircraft. Most prior art designs use a sway brace or cradle built into the structure of the rack to restrain the munition or store from lateral or pitching motion. On ejection, the pistons force the store or munition away from the aircraft, but the sway braces remain on the rack, Thus, there is no restriction on the yaw, pitch, or roll motion of the store or munition during ejection. This is in view of the fact that the item being ejected is still subject to aerodynamic forces while the ejection process is being carried out and is no longer being controlled by the sway braces. Certain prior art sway braces control systems have been developed which include the constraining sway brace on the piston assembly. This extends the yaw and pitch constraint until the article being deployed has left the influence of the pistons. Such a system is described in U.S. Pat. No. 5,904,323 issued on May 18, 1999 to Jakubowski, Jr., et al. While this prior art device is an improvement, it still does not assure the contact of the released article with the sway brace.

SUMMARY OF THE INVENTION

The system of the present invention overcomes the above indicated shortcomings of the prior art by providing a deploying claw mechanism, which is driven out of the sway braces into the article being released and holds the article in place on the sway braces until it is finally released. This end result is achieved by a drive system mounted in the sway braces, which is controlled to drive sharp highly durable claws out of the sway braces into the munition or store. The claws remain extended and retain the munition or store in place on the sway braces until the munition or store falls away from the influence of the sway braces.

DETAILED DESCRIPTION OF THE INVENTION

Figure 1:
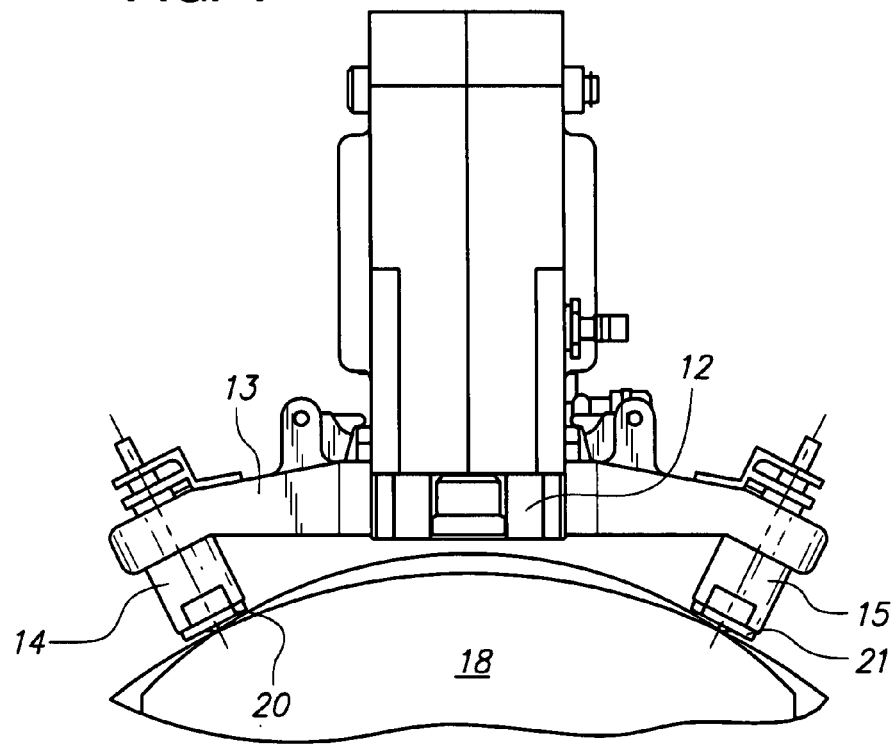
FIG. 1 is a front elevational schematic view of a preferred embodiment of the invention.
Figure 2:
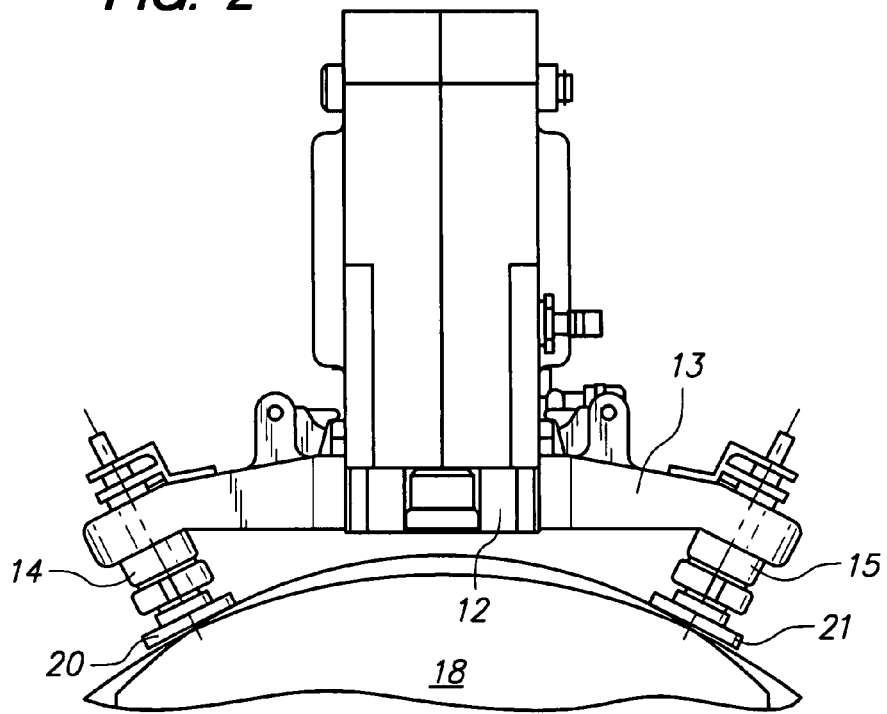
FIG. 2 is a front elevational schematic view of the preferred embodiment with the claws retracted into the foot bodies.
Figure 3:
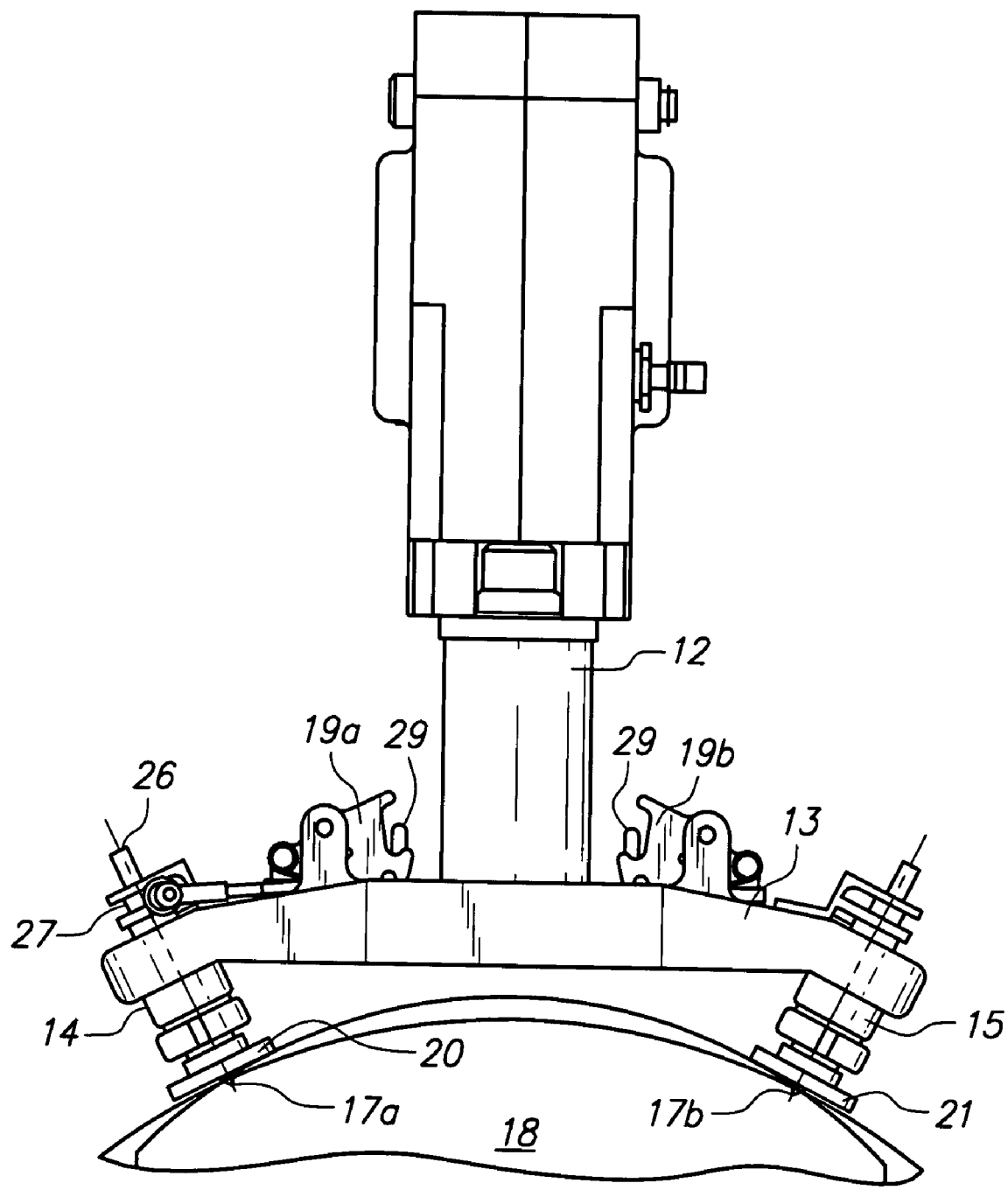
FIG. 3 is a front elevational schematic view of the preferred embodiment with the claws extended out from the foot bodies.

Referring now to FIGS. 1-3 schematic drawings of the preferred embodiment of the invention are shown. The bomb rack has a slidably supported piston mechanism 12 supported therein, which is shown in its driving position in FIG. 3. The sway brace 13 has two foot bodies 14 and 15 on the opposite ends thereof. The foot bodies have foot pads 20 and 21 on their end portions. As shown in FIG. 3, in the actuated or extended mode, the piston extends out slightly from the bomb rack. The device, as described thus far is in the prior art and can be found in cited U.S. Pat. No. 5,904,123; issued May 18, 1999 to Jakubowski, Jr. et al.

The novel features of the present invention are involved with the claws 17a and 17b which are normally held retracted within housing in foot bodies 14 and 15, as can be seen in FIGS. 1 and 2, and which are extended out from foot pads 20 and 21, when the claws are deployed, as shown in FIG. 3. When this occurs, the claws drive into the store or munition being deployed, as shown in FIG. 3. The claws are deployed by the drive action of actuating wheels 19a and 19b, these wheels being releasably locked into the deployed position by locking mechanism 29. as shown in FIG. 4.

Figure 4:
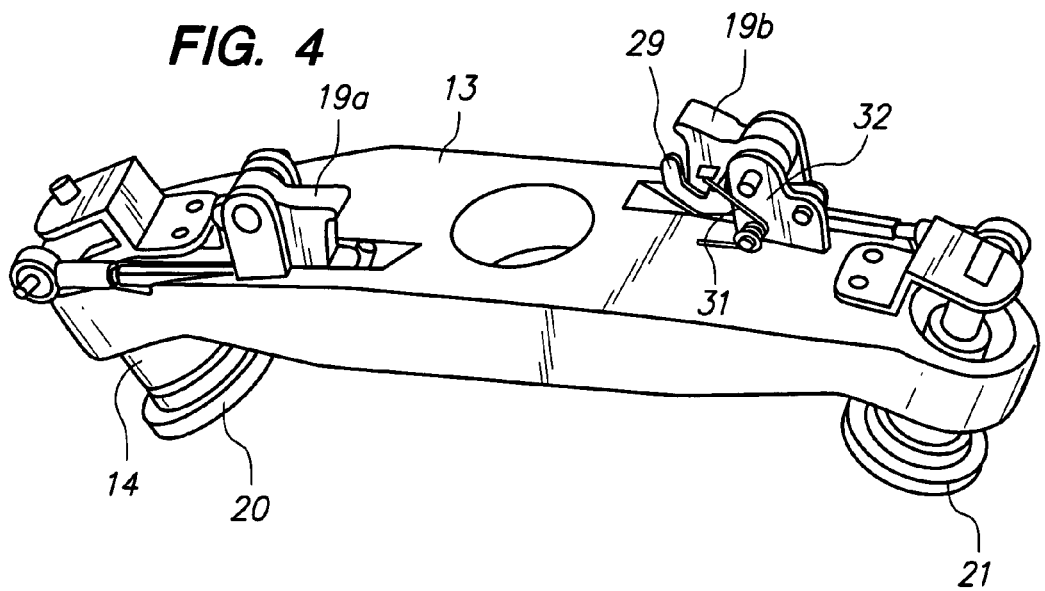
FIG. 4 is a top perspective view of the preferred embodiment showing the sway brace with the locking and release mechanism for the claw mechanism.
Figure 5:
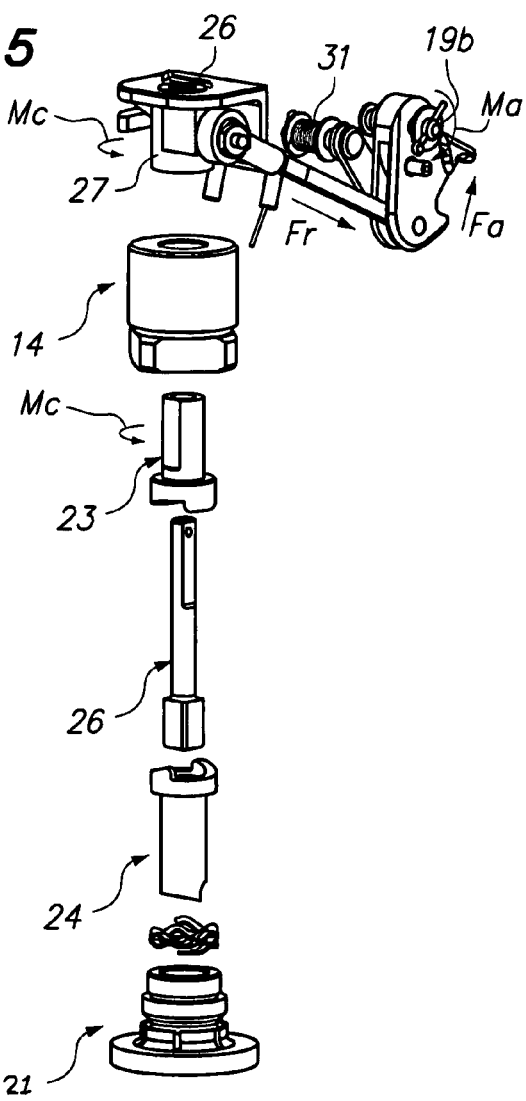
FIG. 5 is an exploded view of the claw deployment mechanism of the preferred embodiment.
Figure 6:
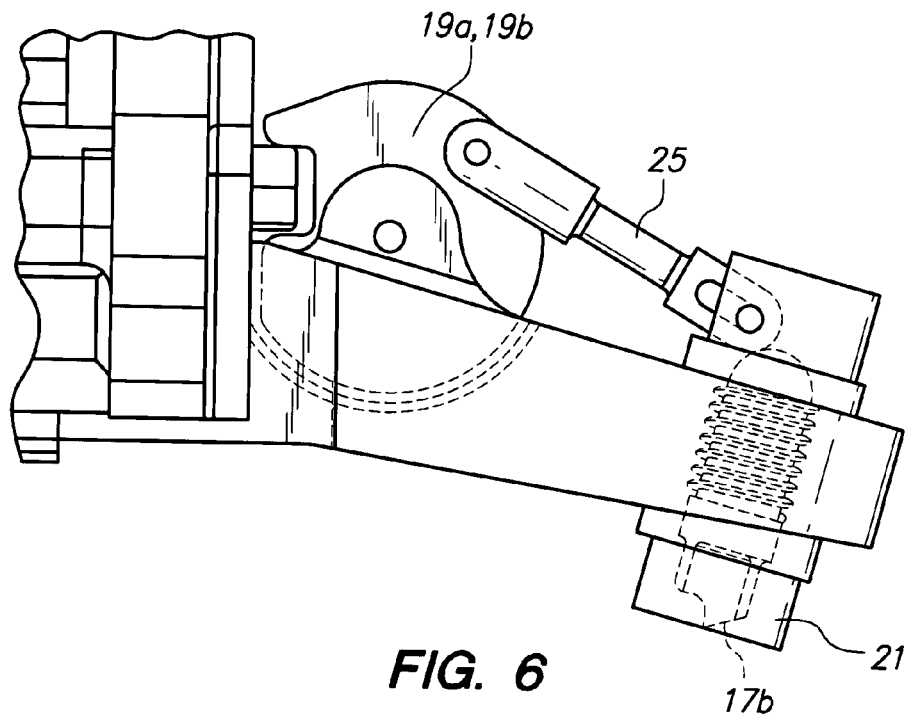
FIG. 6 is a front elevational view of the preferred embodiment in its retracted state.
Figure 7:
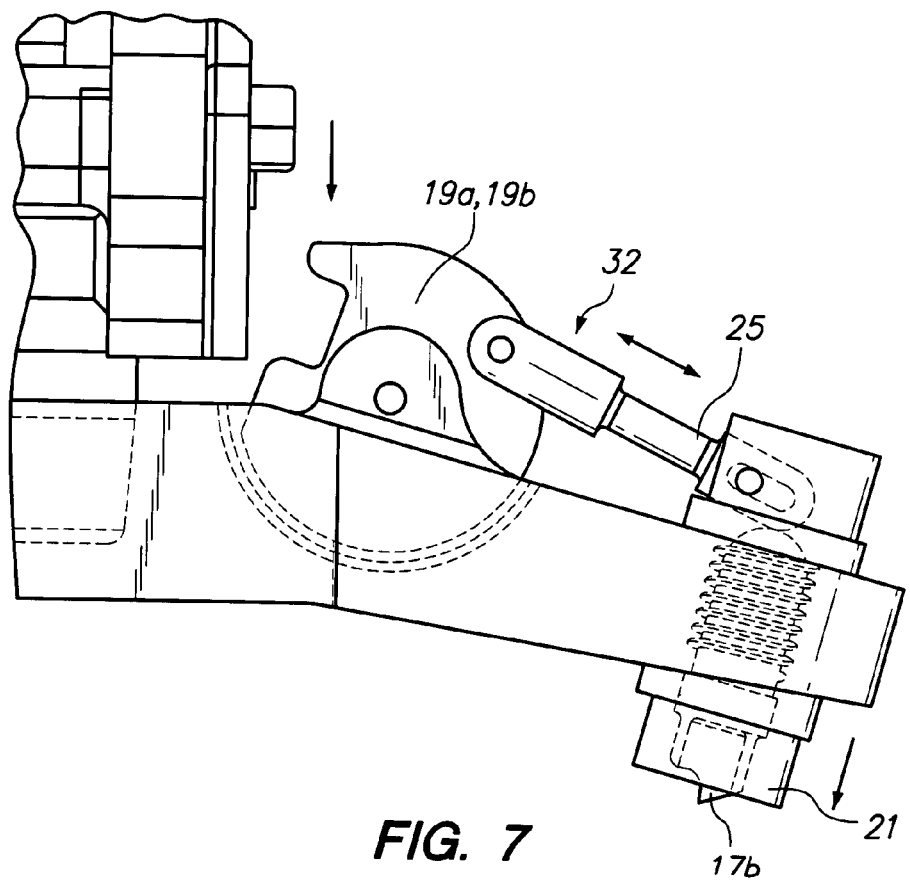
FIG. 7 is a front elevational view of the preferred embodiment showing the drive for the claw extended.

Referring now to FIGS. 4, 5, and 7, the operation of the claw device is illustrated. When the sway braces are retracted, and in storage, the claws 17a and 17b are retracted and retained within swiveling foot pads 20 and 21. As can best be seen in FIG. 5, foot body 14 is threadably attached to swivel foot retainer 26 and along with the driving mechanism 23 and claw deploying device 24 is installed within the foot body 14.

Referring to FIGS. 3 and 5, when the sway brace assembly 13 is driven by piston mechanism 12, actuating wheels 19a and 19b, which are mounted on the sway brace swing upwardly with a force Fa exerted on the wheel causing a moment Ma, as shown in FIG. 5. This results in a force Fr that acts on rod 25. This in turn causes a moment, Mc about the center line of camming mechanism 27 which results in the driving of the driving mechanism 23 with the torque, Mc. Claw deploying device has a sloped surface 24a so that the rotary motion of driving mechanism 23 causes downward motion of the deploying claws, which results in the driving of the sharp hardened claws 17a and 17b, which are connected to the driving mechanism 23, out through foot pad 20 or 21.

Torsion spring 31 is mounted on support member 32 and drives lock mechanism 29 upwardly and retains the lock mechanism in this upward position. Once the actuating wheels 19a and 19b move sufficiently to engage the lock mechanism, as shown in FIG. 4, they are locked in place and held in this locked position by spring 31 so that the claws remained deployed. The claws remain exposed and in their stored position until retraction of the entire sway brace forces lock mechanism 29 down, thereby allowing the mechanism to return to its retracted position.

While the invention has been described and illustrated in detail, this is by way of illustration and example only and is not intended by way of limitation, the coverage of the patent being limited by the terms of the following claims.

We claim:

1. A system for releasing an article from an aircraft, said system including a rack on the aircraft for supporting the article and a pair of sway braces connected to the rack for restraining said article from lateral or pitching motion, the improvement comprising:

claws mounted in each of said sway braces;

a drive system mounted in each of said sway braces for driving said claws into said article thereby retaining the article in place on the rack; and means for withdrawing said claws from said article thereby resetting the claws and permitting said article to be released from the aircraft.

2. The system of claim 1 wherein said sway braces each includes a foot body extending therefrom, said claws being mounted in said foot bodies.

3. The system of claim 2 wherein said foot bodies each has a foot pad at one end thereof which abuts against said article, said claws extending through said foot pads into said article.

4. The system of claim 1 wherein the drive system mounted in each of said sway braces comprises an actuating wheel.

5. The system of claim 4 and further including a piston mounted in said rack which drives said actuating wheels.

6. The system of claim 1 wherein said means for withdrawing said claws from said article comprises a lock release mechanism and a spring released by said lock release mechanism to drive each of said claws.

7. A system for releasing an article including a store or a munition from an aircraft including a rack on the aircraft for supporting said article and a pair of sway braces connected to the rack for restraining said article from lateral or pitching motion, the improvement comprising:

claws connected to each of said sway braces, a foot body extending from each of said sway braces, said claws being mounted in said foot bodies;

a foot pad attached to the end of each of said foot bodies, said claws extending through said foot pads into said article;

a drive system mounted in each of said sway braces for driving the claws into said article, said drive system including actuating wheels and a piston mounted in said rack for driving said actuating wheels, and means for withdrawing said claws from said article.

8. The system of claim 7 wherein said means for withdrawing said claws from said article comprises a lock release mechanism and a spring released from a dormant position by said lock release mechanism to drive each of the claws.

* * * * *